Aug. 8, 1967 J. J. MADDEN 3,335,264
ARTICLE HANDLING APPARATUS
Filed March 21, 1963 5 Sheets-Sheet 1

INVENTOR
BY J. J. MADDEN
Kenneth B. Hamlin
ATTORNEY

Aug. 8, 1967 J. J. MADDEN 3,335,264

ARTICLE HANDLING APPARATUS

Filed March 21, 1963

5 Sheets-Sheet 2

Aug. 8, 1967 J. J. MADDEN 3,335,264

ARTICLE HANDLING APPARATUS

Filed March 21, 1963 5 Sheets-Sheet 5

3,335,264

ARTICLE HANDLING APPARATUS

James J. Madden, Middletown, N.J., assignor to Bell Telephone Laboratories, Incorporated, New York, N.Y., a corporation of New York Filed Mar. 21, 1963, Ser. No. 266,993
10 Claims. (Cl. 235—61.11)

ABSTRACT OF THE DISCLOSURE

Individual article engaging elements in a portable housing operate to withdraw a plurality of parallel card-type articles from a storage location into the housing or to insert into a storage location a plurality of card-type articles from the housing. The article engaging elements are driven by a common electric motor.

This invention relates to article handling apparatus and more particularly to such apparatus for handling a plurality of card-type articles.

Currently, there are an increasing number of systems and circuit arrangements employing large pluralities of movable cards or sheets. This is particularly apparent in the areas of information handling and information storage wherein movable cards are being advantageously utilized having translation patterns, circuit components, storage elements, or the like printed or attached thereon. For example, an information translating arrangement employing a plurality of movable cards having translation patterns of memory elements printed thereon is shown in R. C. Avery-R. H. Gumley-A. Majlinger application Ser. No. 162,162, filed Dec. 26, 1961, now Patent 3,156,898, issued Nov. 10, 1964. Illustrative storage arrangement utilizing pluralities of movable cards upon which information storage elements are located may be found, for example, in the application of S. M. Shackell Ser. No. 708,127, filed Jan. 10, 1958, and in an article entitled, "A Card-Changeable Permanent-Magnet-Twistor Memory of Large Capacity," published in the "I.R.E. Transactions on Electronic Computers," vol. EC–10, pages 451–461, September 1961.

The advantages of using such cards are becoming well known. Thus, printed cards may be readily and economically manufactured in large quantities and they can be easily and compactly stored until their use is desired. Moreover, movable cards may be removed readily and replaced, permitting desired circuit or storage alterations and modifications to be made quickly and accurately with a minimal requirement for specially trained personnel therefor.

However, a usual requirement of such systems and circuit arrangements is that each of the plurality of movable cards be positioned accurately with respect to certain portions of the remainder of the system or circuit arrangement. Further, although the orientation of the cards relative to each other is sometimes fixed or predetermined, in other arrangements random linear and skew variations occur in the relative orientation of the cards which necessitate positioning each card independently at its respective correct location. Thus in information storage arrangements of the type shown in the above-mentioned article and in the S. M. Shackell patent application, for example, each of the movable memory storage cards must be positioned accurately in the memory so that the plurality of bar magnets bonded on the card are each adjacent a respective memory crosspoint. The memory crosspoints are arranged in coordinate rows and columns and in parallel planes; and the memory cards are thus arranged in coplanar relationship, each card being positioned adjacent a respective memory plane. There is often no correlation, however, between the location of the crosspoints of one plane relative to the crosspoints of the other planes. Therefore, independent accommodation is required in the positioning of each of the cards in the memory to assure that each bar magnet thereon is properly oriented adjacent its respective crosspoint.

Heretofore, the individual cards have generally been handled and positioned manually; but this becomes less desirable as the quantity of cards employed in the system increases, inasmuch as considerable time and energy is required therefor which detracts from the advantages for using movable cards. Further, manual manipulation of the cards is a major source of error in the operation of such systems, arising from improper card selection or improper card positioning. Moreover, manual manipulation tends to decrease the life of the cards and may lead to errors due to the elements thereon being damaged or dislocated. Therefore, it is desirable to handle the cards automatically, without the need for intervening manual manipulation thereof, through the use of article handling apparatus.

It is further desirable that such apparatus be capable of handling and positioning large pluralities of cards rapidly and accurately. However, the cards employed in most systems are compactly constructed of relatively thin sheets of material and, consequently, must be handled carefully to avoid bending or damaging the cards during insertion or withdrawal from the system. Therefore, automatic card handling apparatus must be sensitive to pressures due to friction, binding or the like, which may be exerted on each individual card during insertion. Should excessive resistance be met by a card during insertion and positioning, operation should be halted quickly to prevent damage to the cards or to the system, and an indication should be provided directing an operator to the particular card in trouble.

Accordingly, it is a general object of this invention to provide simple, compact and economical article handling apparatus which may be utilized to handle a plurality of card-type articles.

More specifically, it is an object of this invention to provide simple, compact and economical apparatus for inserting and withdrawing a plurality of card-type articles to and from individual predetermined positions.

It is another object of this invention to provide apparatus for automatically transferring each of a plurality of card-type articles substantially simultaneously from first card locations to second card locations, the first and second card locations being in random relative orientation with one another.

A further object of this invention is to provide apparatus for accurately and rapidly positioning each of a plurality of card-type articles individually with respect to predetermined orientations.

A still further object of this invention is to provide apparatus for automatically handling card-type articles to minimize the need for manual intervention or manipulation.

The above and other objects are attained in an illustrative embodiment of card handling apparatus in accordance with the principles of the present invention, wherein each of a plurality of cards is individually engaged by a respective card engaging element for concurrent movement between first card locations and second card locations. The individual card engaging elements are operable at both the first and second card locations to engage the respective cards independently for concurrent movement of the cards. The first card locations may be situated advantageously in a movable housing comprising the plurality of card engaging elements. In this manner a plurality of cards are insertable from the first card locations in the housing into variously situated second card locations and, conversely, a plurality of cards are withdrawable from variously situated second card locations into the housing.

According to one aspect of the present invention, each card engaging element in the housing pivotally engages a respective card, the pivotal engagement accommodating random variations in the individual card orientations at the first and second card locations.

In accordance with another aspect of my invention each card engaging element is individually sensitive to unusual or excessive resistance to movement of the respective card engaged thereby. Such unusual resistance to movement may occur, for example, in the case of a damaged card or a damaged card location. Responsive to excessive resistance to movement of one or more cards, apparatus including the respective individual card engaging element or elements operates to halt further movement of the cards and to signal an operator. An indication is provided to the operator to permit identification of the particular card or cards in trouble.

In accordance with a further aspect of my invention, particularly where the first card locations are situated in a movable housing, individual detent apparatus is provided to releasably retain the plurality of cards in the first card locations upon disengagement of the card engaging elements from the cards. The detent apparatus minimizes the possibility of accidentally dislodging the cards from the first card locations or the housing, yet permits them to be individually withdrawn therefrom and reinserted manually when desired, such as for replacement of individual cards.

It is, therefore, a feature of my invention that card handling apparatus comprise individual card engaging elements operable to pivotally engage respective ones of a plurality of cards for bidirectional movement between randomly oriented card locations.

A further feature of my invention relates to card handling apparatus comprising card engaging elements individually responsive to a predetermined resistance to movement of a respective card engaged thereby for halting movement of the card and for identifying the respective card in trouble.

Another feature of my invention relates to card handling apparatus comprising a movable housing including a plurality of card engaging elements for individually engaging a plurality of cards for withdrawing the cards from randomly oriented locations into the housing and, also, for inserting and positioning the cards into randomly oriented locations.

The above and other objects and features of the present invention may be better understood upon consideration of the following detailed description and the accompanying drawing in which.

For the purpose of facilitating description of an illustrative embodiment of the present invention, it has been assumed that the articles to be handled thereby are cards such as used in card-changeable memories of the type described, for example, in the above-mentioned article and in the S. M. Shackell patent application. Therein the removable memory cards each have a plurality of information bit magnets bonded or deposited on one surface of the card and arranged in coordinate rows and columns. The individual memory cards are situated in respective planes of the memory so that each bit magnet is accurately located in the proximity of a respective memory crosspoint. However, as mentioned above, there is often no correlation between the location of the crosspoints of one memory plane relative to the crosspoints of the other memory planes. Rather, the correct location for a card adjacent to a plane is independently defined for the respective plane during construction of the memory, such as through individual card positioning stops for the respective memory planes. Thus random linear and skew variations may be present in the relative orientation of the individual cards when correctly positioned in the memory, which variations are advantageously accommodated by operation of the present card handling apparatus.

Figure 1:
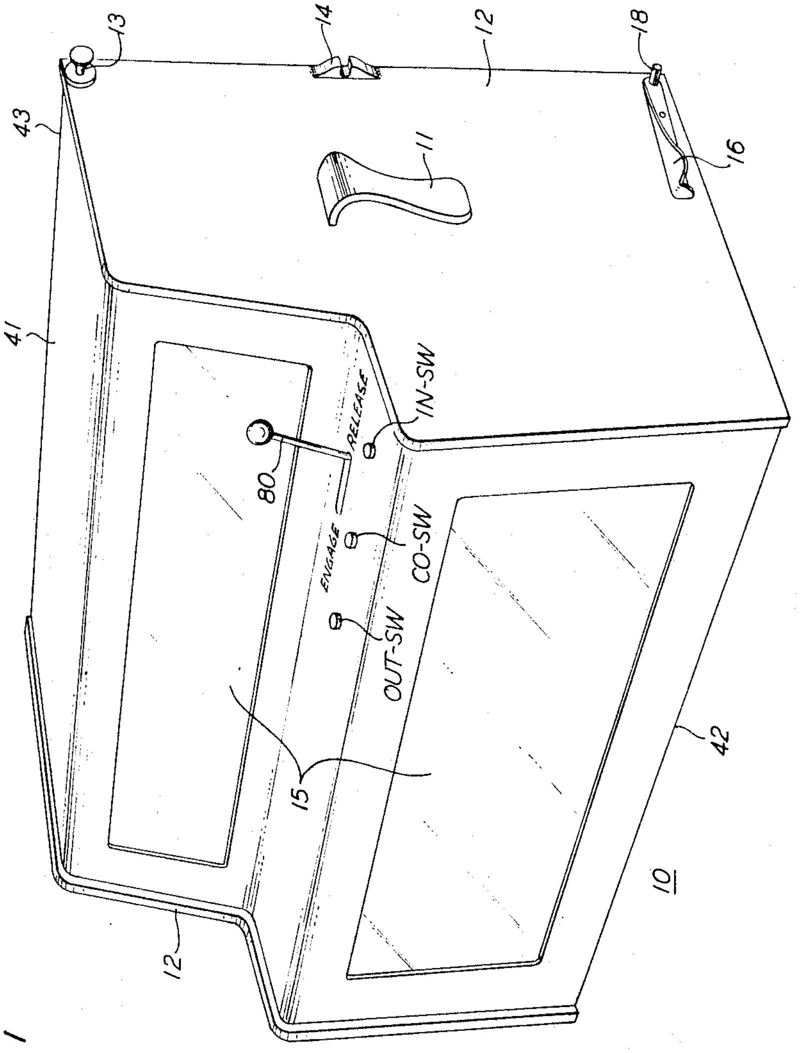
FIG. 1 is a pictorial representation of an illustrative movable housing embodying the present invention.

The present apparatus for handling such cards is arranged in a movable housing 10, illustratively depicted in FIG. 1. A plurality of cards are transportable in housing 10 for insertion through open side 43 thereof into various remote card locations and, further, may be withdrawn from various remote card locations through open side 43 into housing 10. Within housing 10 the cards are respectively disposed in individual card locations such as individual slots or grooves located along the inner surfaces of sides 41 and 42. Housing 10 has a pair of handles 11 arranged on sides 12 thereof to permit the housing, and any cards therein, to be manually transported by an operator. A hanger guide pin 13 is provided on each side 12 which engages mating elements at the card locations for supporting and positioning housing 10 adjacent thereto when inserting or withdrawing cards. Guide elements 14 accurately located housing 10 adjacent the card locations; and a locking level 16 on each side 12 operates to clamp housing 10 in position, movement of lever 16 causing pin 18 thereof to engage a mating element at the card locations. Openings or transparent windows 15 are provided in housing 10 to permit operation of the card handling apparatus therein to be visually observed. Operation of the apparatus is controlled by pushbutton switches IN–SW, OUT–SW and CO–SW, and by operating lever 80 which is movable between two positions, respectively designated "ENGAGE" and RELEASE" in FIG. 1. The function and operation of these switches and of lever 80 are described in detail below.

Figure 2:
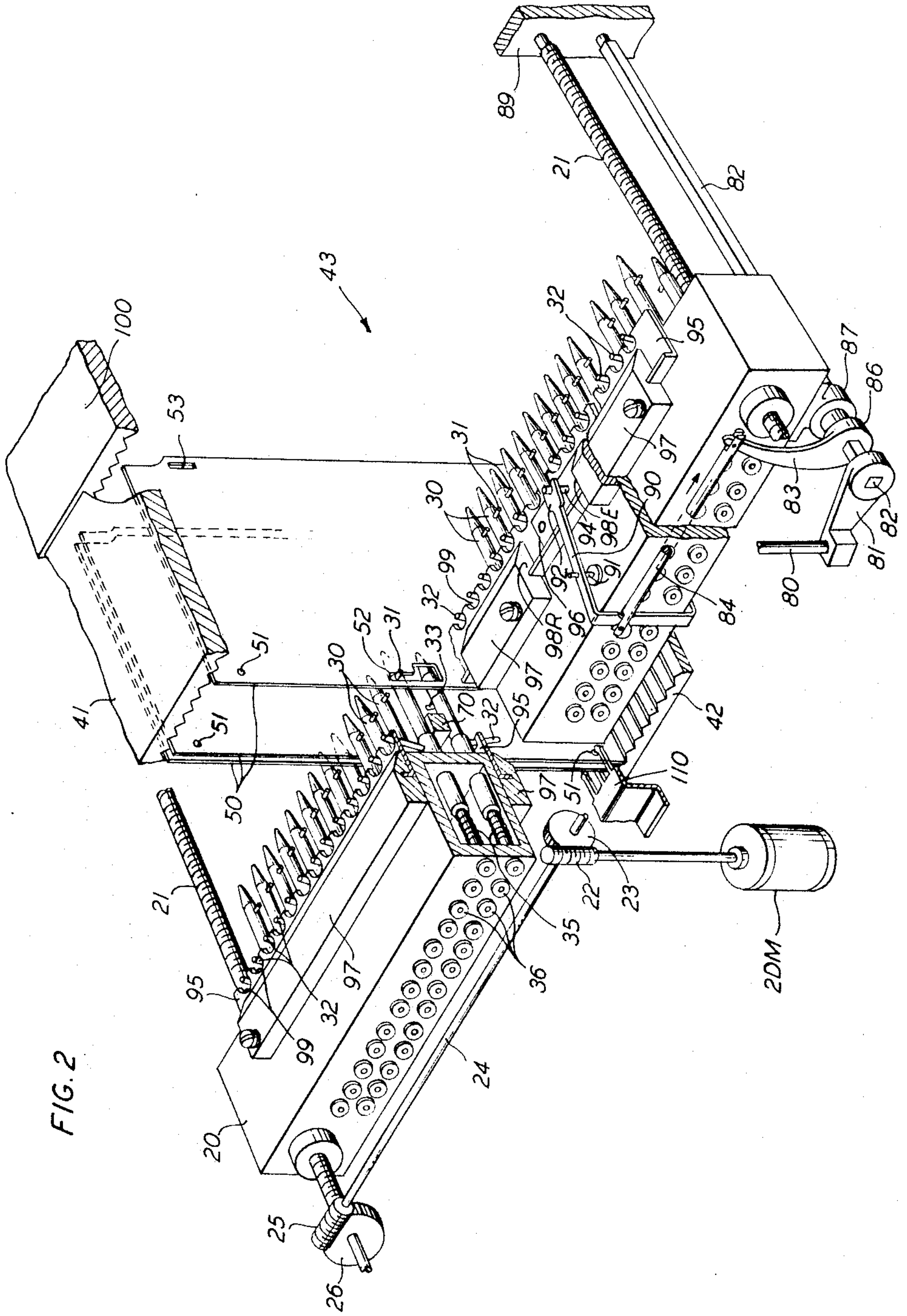
FIG. 2 shows an illustrative embodiment of card handling apparatus in accordance with the principles of the present invention.
Figure 3:
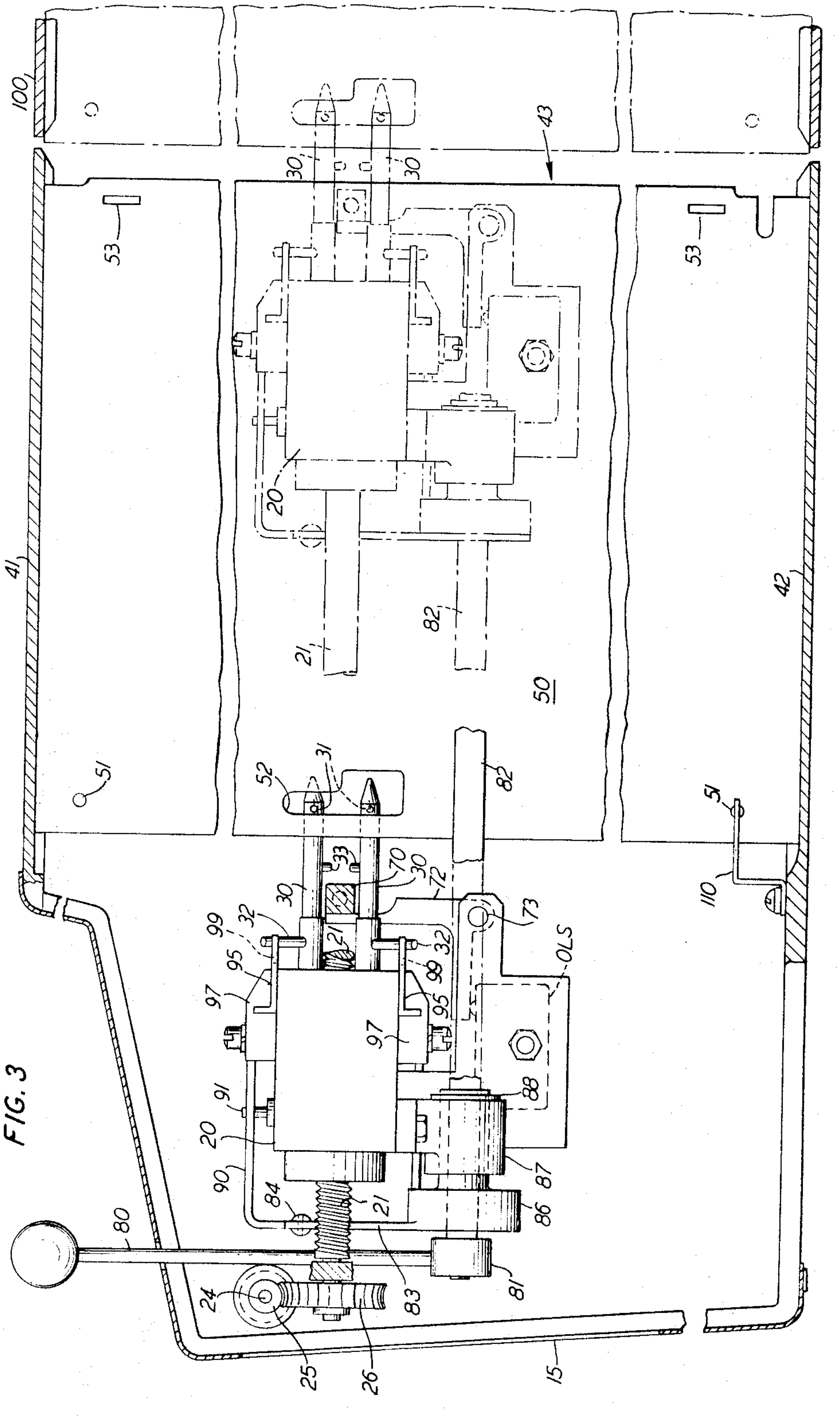
FIG. 3 is a side view of the illustrative embodiment of card handling apparatus shown in FIG. 2.

Card-changeable memories are typically arranged in modules each comprising like pluralities of removable storage cards. The present card handling apparatus advantageously has sufficient capacity for handling a module of cards at one time, illustratively 128 cards. For the purposes of clarity, however, only a small number of cards 50 and card engaging elements 30 are shown in FIGS. 2, 3, 4A and 4B, these being deemed adequate for a clear understanding of the principles and the operation of the present invention. Each card 50 as shown in FIG. 3 has a centrally located aperture 52 along one side thereof which is pivotally engaged by a respective one of card engaging elements 30 for moving and positioning the individual cards 50. Apertures 51 on each card 50 are utilized in connection with detent apparatus 110 to releasably retain individual ones of cards 50 in position within housing 10 when aperture 52 is not engaged by elements 30. Each card 50 also has a pair of apertures 53 which are utilized by information recording apparatus, such as shown in C. F. Ault-D. Friedman-R. H. Granger-J. J. Madden Patent 3,281,807, issude Oct. 25, 1996, to withdraw cards 50 individually from housing 10 for recording information thereon. The location of apertures 51, 52 and 53 is such as to permit cards 50 to be advantageously handled by the present apparatus with their magnet bearing surfaces facing either left or right in FIG. 2. This is desirable inasmuch as the cards in a memory module are often arranged in an interleaved fashion, the magnet-bearing surfaces of successive cards alternately facing in opposite directions. Thus, for the purposes of illustration, it is assumed herein that cards 50 are divided into two interleaved groups with respect to the direction their magnet-bearing surfaces face, one group having their magnet-bearing surfaces facing left and the other group having their magnet-bearing surfaces facing right.

Card engaging elements 30 are mounted in carriage assembly 20 which is supported within housing 10 on lead screws 21. Carriage assembly 20 is in threaded engagement with lead screws 21 for movement therealong when motor 2DM is energized. Rotation of motor 2DM is coupled to lead screws 21 through a gear arrangement of suitable ratio, such as shown in FIG. 2. Thus motor 2DM is coupled, for example, through worm 22 and wheel gear 23 to cross-shaft 24, which is in turn coupled through individual sets of worm and wheel gears 25 and 26 to each of lead screws 21 (one set of gears 25 and 26 is not shown in FIG. 2). When motor 2DM is energized in one rotational direction, forward movement is imparted to carriage assembly 20 toward open side 43 of housing 10 via lead screws 21. Open side 43 of housing 10, through which cards 50 are handled, will be referred to herein as the front of housing 10. Energization of motor 2DM in the opposite rotational direction imparts movement to carriage assembly 20 in the reverse direction toward the rear of housing 10. The rearmost position of carriage assembly 20 within housing 10, the position in which assembly 20 is shown in FIGS. 2 and 3, will be referred to herein as the home position of carriage assembly 20. Carriage assembly 20 is normally situated in its home position between card handling operations and when cards 50 have been fully withdrawn into housing 10 by card engaging elements 30.

Figure 6A:
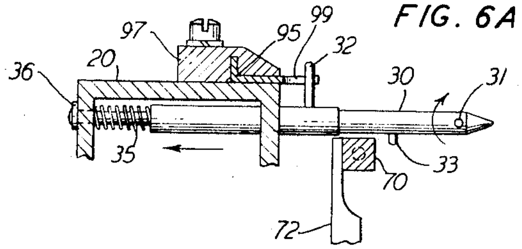
FIGS. 6A and 6B show details of an individual card engaging element of the illustrative embodiment of card handling apparatus shown in FIGS. 2 through 4.
Figure 6B:
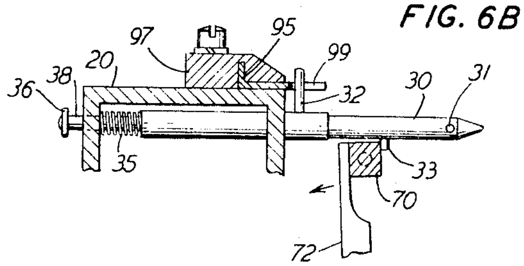

Each card engaging element 30 is individually mounted in carriage assembly 20 for linear movement in an axial direction and for rotational movement about its axis, as shown in FIGS. 6A and 6B to which reference is now made. Each element 30 is spring-biased in its linear position relative to assembly 20 by an individual spring 35 and is limited in movement from this position by retaining clip 36 to the direction indicated in FIG. 6A. The bias presented by spring 35 is sufficient to prevent any substantial linear movement of element 30 relative to carriage assembly 20 during normal card handling operation. If, however, during the movement of carriage assembly 20 toward the front of housing 10 by any card engaging element 30 encounters greater than normal resistance to movement, the bias of its spring 35 is overcome thereby. Thus, spring 35 is compressed and a portion 38 of the particular card engaging element 30 is caused to protrude from carriage assembly 20, as shown in FIG. 6B. The protruding portion 38 of element 30 is visible through windows 15 of housing 10, advantageously identifying the particular card engaging element 30 encountering trouble. As will be described in greater detail below, movement of element 30 relative to assembly 20 in the direction indicated causes overload pin 33 of the particular element 30 to impinge upon overload bar 70, thereby operating switch OLS to brake forward movement of carriage assembly 20.

Figure 4B:
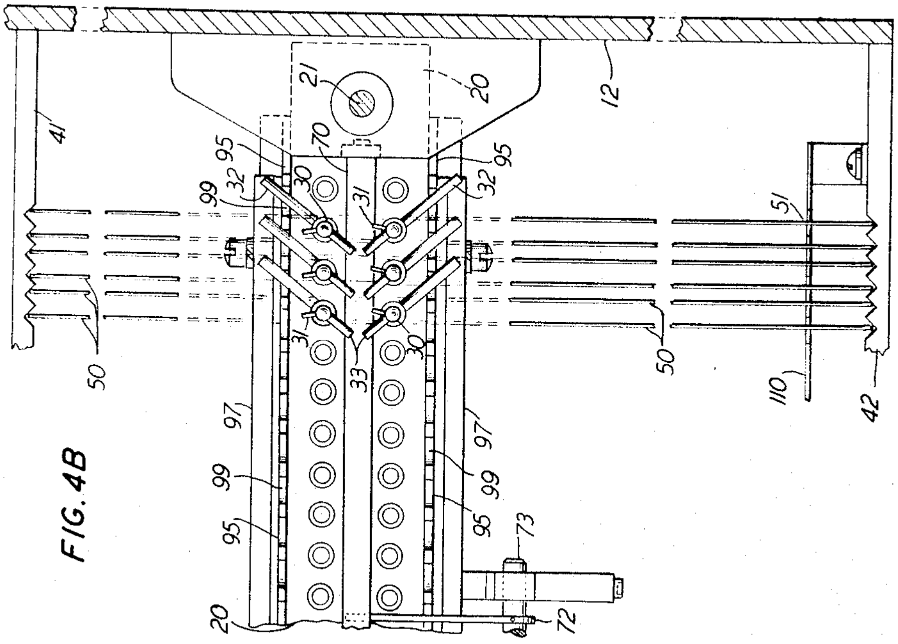
FIGS. 4A and 4B show another view of the illustrative embodiment of card handling apparatus shown in FIGS. 2 and 3.
Figure 4A:
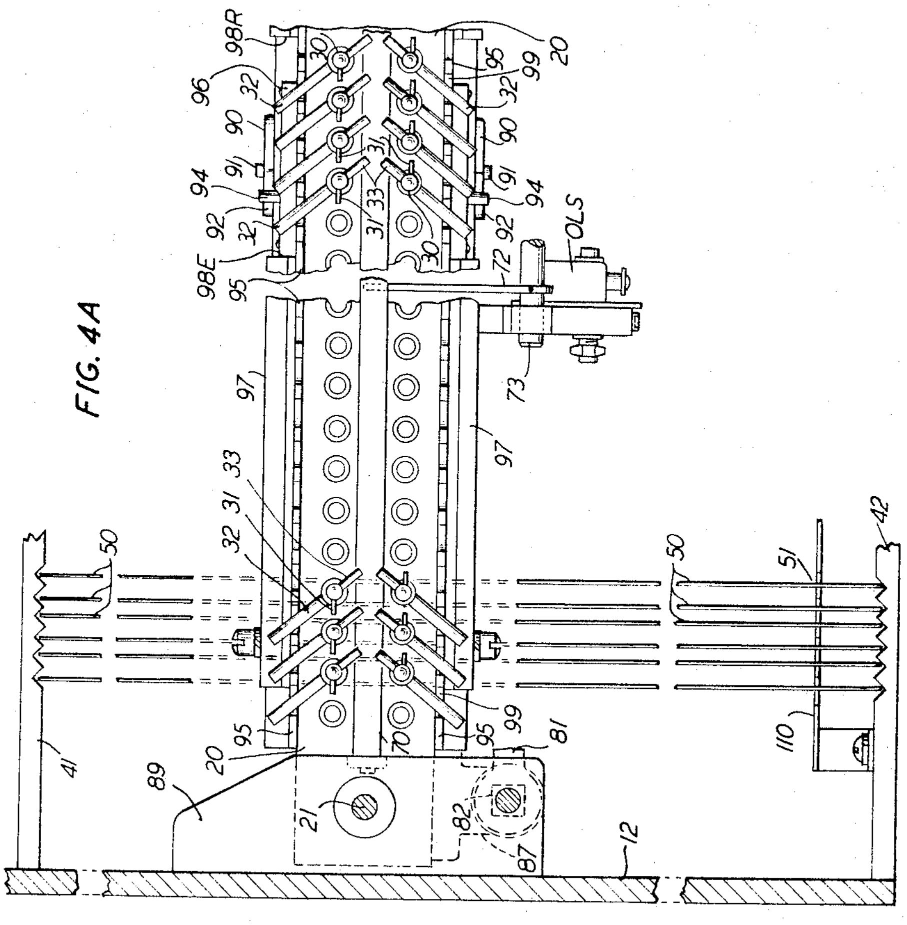

In addition to overload pin 33, each card engaging element 30 has an individual card engaging pin 31 and an operating pin 32 rigidly disposed thereon in the relationship shown, for example, in FIGS. 3, 4A and 4B. Card engaging elements 30 are rotatable within assembly 20 between two distinct positions designated "ENGAGE" and "RELEASE," shown in FIGS. 4A and 4B, respectively. When card engaging elements 30 are rotated to the "ENGAGE" position shown in FIG. 4A, such as when cards are to be withdrawn from a memory module, card engaging pins 31 move into engagement with apertures 52 of respective cards 50 adjacent thereto. Subsequent movement of carriage assembly 20 consequently imparts movement to cards 50 thus engaged. When card engaging elements 30 are rotated to the "RELEASE" position shown in FIG. 4B, such as following insertion of cards 50 into a memory module, pins 31 are disengaged from apertures 52 and subsequent movement of carriage assembly 20 toward its home position imparts no movement to cards 50.

Card engaging elements 30 may be arranged advantageously in two rows in carriage assembly 20, as illustratively shown herein. Elements 30 in the top row of the illustrative embodiment thus engage alternate ones of cards 50, that is, those cards having their magnet-bearing surfaces facing in one direction; and elements 30 in the bottom row engage cards 50 having their magnet-bearing surfaces facing in the opposite direction. This arrangement provides greater spacing between adjacent ones of elements 30 and minimizes the possibility of interference between card engaging pins 31 and adjacent elements 30 during rotational movement of elements 30. Further, this permits card engaging pins 31 to be of greater length to insure proper engagement of apertures 52 of respective cards 50 when elements 30 are rotated to the position shown in FIG. 4A. Apertures 52 may be shaped, as illustratively shown in FIGS. 2 and 3, to insure that a card 50 is engaged during insertion by pin 31 of its respective card engaging element 30 only. If pin 31 of a card engaging element 30 extends sufficiently through aperture 52 of card 50 engaged thereby so as to enter aperture 52 of an immediately adjacent card 50, it will enter the enlarged portion thereof and thus will not engage adjacent card 50 during insertion.

The rotational position of card engaging elements 30 is controlled by operating lever 80. Movement of operating lever 80 into its "ENGAGE" or "RELEASE" position effects the rotation of elements 30 to their correspondingly designated positions. Operating lever 80 is rigidly coupled via arm 81 to shaft 82, as shown in FIG. 2, such that movement of lever 80 between its two positions effects a corresponding rotation of shaft 82. Rotational movement of shaft 82 is transmitted via arm 83 into longitudinal movement of connecting member 84 which is coupled to U-shaped lever yoke 90. Yoke 90 is pivotally mounted on carriage assembly 20 via pins 91; and ends 92 of yoke 90 engage pins 94 of each of element operating members 95, members 95 being coupled via bearing blocks 97 for sliding longitudinal movement relative to carriage assembly 20. Thus longitudinal movement of member 82 in one direction is transmitted through lever yoke 90 into longitudinal movement of both of element operating members 95 in the opposite direction.

Slots 99 of members 95 individually engage operating pins 32 of respective ones of card engaging elements 30 such that longitudinal movement of element operating members 95 is transmitted into rotational movement of elements 30. The distance members 95 move, and thus the angle through which elements 30 rotate, is determined by an individual stop 96 rigidly affixed to each of members 95 acting in conjunction with abutting surfaces 98E and 98R of bearing blocks 97. When members 95 are moved to the right such that stop 96 abuts surface 98E, as shown in FIG. 2, card engaging members 30 are rotated to the "ENGAGE" position shown in FIG. 4A. Conversely, when lever 80 is moved to the right toward its "RELEASE" position, imparting clockwise rotation to shaft 82 in FIG. 2, connecting member 84 moves to the right and, via yoke 90, urges members 95 toward the left. Movement of members 95 to the left is stopped when stop 96 abuts surface 98R, elements 30 being thus rotated to the "RELEASE" position shown in FIG. 4B. Stops 96 and abutting surfaces 98E and 98R further function advantageously to limit rotation of elements 30 so that operating pins 32 thereof are not disengaged from slots 99 of elements 95.

Card engaging elements 30 are operable to engage and to release cards 50 regardless of the location of carriage assembly 20 within housing 10. For this purpose a guide bearing 86 and a journal bearing 87 are employed in conjunction with arm 83. Journal bearing 87 is rigidly connected to carriage assembly 20; and guide bearing 86 is rigidly connected to arm 83 and is slidably mounted on shaft 82. Guide bearing 86, and thus arm 83, is prevented from rotational movement relative to shaft 82 by a key thereof engaging a keyway in shaft 82 or by the use of a noncircular shaft. The latter method is illustrated herein, shaft 82 being square in cross-section and engaging a similarly-shaped opening through bearing 86. Guide bearing 86, and thus arm 83, is rotatably coupled to carriage assembly 20 via journal bearing 87, and is prevented from longitudinal movement relative thereto by retaining element 88. Accordingly, all of the above-described apparatus for rotating card engaging elements 30, except operating lever 80, arm 81 and shaft 82, are coupled to and are transported by carriage assembly 20.

Further, overload apparatus comprising overload bar 70, coupling arms 72 and overload switch OLS is coupled to and transported by carriage assembly 20. Arms 72 are rigidly connected to bar 70 and are pivotally disposed relative to assembly 20 on shaft 73. Overload 70 is disposed relative to card engaging elements 30 such that movement of any one of elements 30 in a direction toward carriage assembly 20, compressing its respective spring 35, causes overload pin 33 thereof to impinge upon bar 70. Switch OLS is rigidly coupled to carriage assembly 20 and arranged to be operated by movement of one of arms 72. Therefore, force exerted on bar 70 in a direction toward carriage assembly 20, such as when overload pin 33 of one of elements 30 impinges thereon, is transmitted via movement of one of arms 72 to operate switch OLS.

Figure 5:
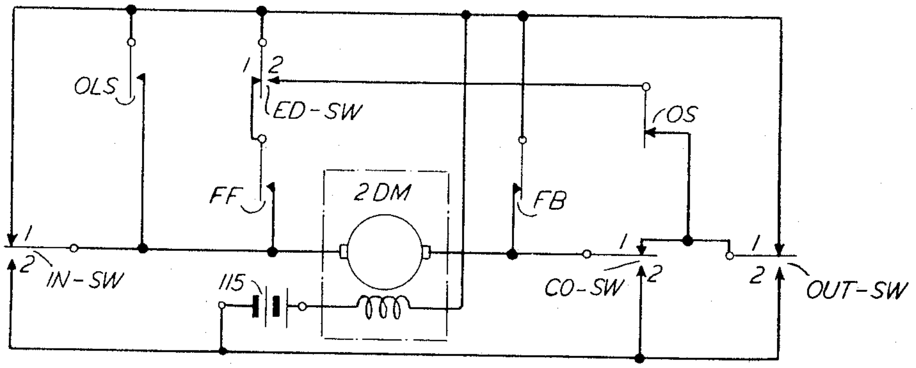
FIG. 5 is an illustrative circuit diagram for operating the card handling apparatus of FIGS. 2, 3 and 4.

The operation of the card handling apparatus described above and shown in FIGS. 2 through 4B will now be described with reference to the illustrative circuit in FIG. 5. In addition to motor 2DM, pushbutton switches IN–SW, OUT–SW and CO–SW, and overload switch OLS, the illustrative operating circuit shown in FIG. 5 comprises switches ED–SW, OS, FF and FB. For purposes of clarity these additional switches are not shown in FIGS. 2 through 4B; however, their function and operation will be fully apprehended from the description hereinbelow. Specifically, switch ED–SW is operated by operating lever 80, position "RELEASE" of lever 80 operating switch ED–SW to contact 1 thereof and position "ENGAGE" operating switch ED–SW to its contact 2; switch FB closes when carriage assembly 20 is in its home position; and switch FF closes and switch OS opens when carriage assembly 20 is positioned at the front of housing 10 such that pins 31 of elements 30 are adjacent apertures 52 of cards 50 in a memory module, switch FF being employed during withdrawal of cards 50 and switch OS being employed during insertion of cards 50 into a module. The various switches are normally in the positions shown in FIG. 5 when the card handling apparatus is not in use, lever 80 being in the "RELEASE" position operating switch ED–SW to contact 1 thereof, switch FF being open and switch OS being closed, pushbutton switches IN–SW, OUT–SW and CO–SW being released to their back contacts 1 and carriage assembly 20 being in its home position closing switch FB.

Assume then, for example, that it is desired to withdraw a plurality of cards 50 from respective card locations, such as card locations 100 in FIGS. 2 and 3. Initially, housing 10 is supported and positioned adjacent card locations 100 by hanger pins 13 and guide elements 14 and is locked into position by operating locking levers 16. Operation of pushbutton switch IN–SW to its front contact 2 completes a path energizing motor 2DM to drive carriage assembly 20 forward on lead screws 21 toward the front of housing 10. This path may be traced from one terminal of source 115 through front contact 2 of switch IN–SW, the armature of motor 2DM, back contact 1 of switch CO–SW, back contact 1 of switch OUT–SW, and the field winding of motor 2DM to the other terminal of source 115. As carriage assembly 20 moves forward from its home position switch FB opens. Motor 2DM continues to drive carriage assembly 20 forward toward card locations 100 until card engaging pins 31 of elements 30 reach a position adjacent apertures 52 of the respective individual cards 50 in card locations 100, thereby closing switch FF. This is the position in which carriage assembly 20 is shown in dashed lines in FIG. 3.

Closure of switch FF completes a path shorting out the armature of motor 2DM, providing dynamic braking to bring forward movement of carriage assembly 20 quickly to a halt. The shorting connection across the armature of motor 2DM may be traced through closed switch FF, contact 1 of switch ED–SW, back contact 1 of switch OUT–SW and back contact 1 of switch CO–SW. Pushbutton switch IN–SW is then released to its back contact 1, breaking the operating path for motor 2DM. Lever 80 is moved to the "ENGAGE" position, thereby rotating card engaging elements 30 to the position shown in FIG. 4A. Card engaging pin 31 of each element 30 thus pivotally engages aperture 52 of a respective one of cards 50 in card locations 100. Switch ED–SW is operated to its contact 2 when lever 80 is moved to the "ENGAGE" position, removing the shorting connection from the armature of motor 2DM.

Engaged cards 50 are withdrawn from card locations 100 into housing 10 by operating pushbutton switch CO–SW to its front contact 2. This completes a path from the one terminal of source 115 through front contact 2 of switch CO–SW, the armature of motor 2DM, back contact 1 of switch IN–SW and the field winding of motor 2DM to the other terminal of source 115. Motor 2DM is energized in this path in the reverse direction to drive carriage assembly 20 toward its home position at the rear of housing 10. Cards 50 engaged by pins 31 of elements 30 are thus withdrawn into individual slots or card locations within housing 10. When carriage assembly 20 reaches its home position, closing switch FB, a shorting connection is completed across the armature of motor 2DM to bring assembly 20 to a halt in its home position. This shorting connection may be traced through switch FB and back contact 1 of switch IN–SW. Release of switch CO–SW to its back contact 1 removes source 115 from motor 2DM. Housing 10 may now be removed from card locations 100 and manually transported elsewhere, cards 50 being retained therein by card engaging elements 30 in the "ENGAGE" position.

For example, cards 50 may be transported in housing 10 to information recording apparatus for recording information thereon. In the above-identified Ault-Friedman-Granger-Madden patent, for example, a plurality of cards 50 disposed in a magazine such as housing 10 are individually withdrawn therefrom one at a time, information is recorded thereon, and they are reinserted into the magazine. For this purpose, when housing 10 is clamped in position on the information recording apparatus, operating lever 80 is moved to the "RELEASE" position to disengage elements 30 from cards 50 to permit them to be withdrawn individually from housing 10. Detent apparatus 110 is provided to releasably retain the individual cards 50 in position in housing 10 upon disengagement of elements 30 from cards 50. One of apertures 51 on each of cards 50 is engaged by detent apparatus 110. This minimizes possibility of accidentally dislodging cards 50 from their positions within housing 10, yet permits them to be individually withdrawn therefrom and reinserted by the information recording apparatus, or manually if desired.

Assume now that housing 10 containing a plurality of cards 50 engaged therein is positioned and locked adjacent card locations, such as card locations 100, into which cards 50 are to be inserted. Operating lever 80 is in the "ENGAGE" position with switch ED–SW thus operated to contact 2, and all other switches are initially in the respective positions shown in FIG. 5. Pushbutton switch IN–SW is operated to its front contact 2 to complete a previously-traced path energizing motor 2DM to drive carriage assembly 20 forward toward the front of housing 10. Carriage assembly 20 moves forward, releasing switch FB, pins 31 of elements 30 pivotally engaging respective ones of cards 50 via apertures 52 to insert cards 50 into card locations 100. The pivotal engagement of cards 50 during insertion into locations 100 accommodates random variations which may occur in the relative orientations of each of cards 50 in housing 10 and in card locations 100.

Subsequent closure of switch FF has no effect on the operation of motor 2DM since switch ED–SW is operated to its contact 2. Thus drive motor 2DM continues to drive carriage assembly 20 forward, pushing cards 50 against their respective individual positioning stops in card locations 100, until the bias of spring 35 of at least one of card engaging elements 30 is overcome. Overload bar 70 is accordingly depressed to close switch OLS in the manner described above, thereby completing a shorting connection through back contacts 1 of switches OUT-SW and CO–SW across the armature of motor 2DM. Forward motion of carriage assembly 20 is stopped, and subsequent release of switch IN–SW to its back contact 1 removes power from motor 2DM.

In the position in which carriage assembly 20 is stopped upon insertion of cards 50 into card locations 100, switch FF is closed and switch OS is released. Operation of pushbutton switch OUT–SW to its front contact 2 completes a path from one terminal of source 115 through back contact 1 of switch CO–SW, the armature of motor 2DM, back contact 1 of switch IN–SW, and the field winding of motor 2DM to the other terminal of source 115. Motor 2DM is energized in the reverse direction to back carriage assembly 20 away from card locations 100, thereby releasing the pressure exerted via springs 35 and pins 31 of elements 30 on inserted cards 50. When carriage assembly 20 has been backed away from cards 50 to a position relative thereto such that pins 31 no longer exert insertion pressure on cards 50, switch OS closes and switch FF releases. Closure of switch OS completes a shorting connection across the armature of motor 2DM, which may be traced through back contact 1 of switch CO–SW, switch OS, contact 2 of switch ED–SW, and back contact 1 of switch IN–SW. Movement of carriage assembly 20 is stopped in this position which, it will be recalled, is the position of assembly 20 during withdrawal operation when lever 80 is operated to engage cards 50.

Operating lever 80 is now moved to the "RELEASE" position, rotating elements 30 to the position shown in FIG. 4B to disengage pins 31 from apertures 52 of cards 50. Switch ED–SW is operated to its contact 1, removing the shorting connection from the armature of motor 2DM. If switch OUT–SW was released to its back contact 1, it is now re-operated to front contact 2 to complete the previously-traced reverse operating path for motor 2DM. Motor 2DM is energized and continues to drive carriage assembly 20 toward its home position. When carriage assembly 20 reaches its home position at the rear of housing 10, switch FB is closed to short out the armature of motor 2DM and stop motion of assembly 20. Release of switch OUT–SW to its back contact 1 restores the operating circuit to its initial condition shown in FIG. 5.

This manner of inserting cards 50 into card locations 100 advantageously utilizes the forces individually available to each element 30 via its spring 35, along with the pivotal engagement of cards 50 by elements 30, to individually position each of cards 50 in their respective correct positions in card locations 100. There is no requirement that card locations 100 be precisely oriented relative to one another, nor that card locations 100 be precisely oriented relative to the card locations in housing 10. Random linear and skew variations between these relative card orientations are thus accommodated advantageously by the present card handling apparatus during insertion of cards 50 into card locations 100 and, also, during withdrawal of cards 50 from locations 100.

Further, each card engaging element 30 is individually sensitive to unusual or excessive resistance to movement during insertion of a respective card 50 engaged thereby. Such unusual resistance to movement may occur, for example, in the case of a damaged card or a damaged card location. If, during the forward movement of carriage assembly 20 sufficient resistance is met by an engaged card 50 to overcome the bias of spring 35 of element 30 engaging that card, spring 35 is compressed by element 30 and pin 33 impinges upon overload bar 70. Bar 70 is moved toward assembly 20, this movement being transmitted via arm 72 to close switch OLS. Closure of switch OLS completes a shorting connection across the armature of motor 2DM to stop forward movement of carriage assembly 20. Portion 38 of the particular card engaging element 30 protrudes from assembly 20 to identify the element 30, and thus the card 50 engaged thereby, encountering trouble.

It is understood that the above-described arrangements are merely illustrative of the application of the principles of the invention. Numerous other arrangements may be devised by those skilled in the art without departing from the spirit and scope of the invention.

What is claimed is:

1. Apparatus for handling a plurality of cards for transferring said cards concurrently between first card locations and second card locations in random orientations with said first card locations, comprising individual card engaging means for pivotally engaging each of said cards independently of one another, said individual card engaging means being movable between said first and second card locations, driving means for concurrently moving said individual engaging means between said first and second card locations, means including said individual card engaging means for detecting predetermined resistance to movement of individual ones of cards between said first card locations and said second card locations, and means responsive to said detecting means for braking said driving means.

2. Card handling apparatus in accordance with claim 1 further comprising means including said individual card engaging means responsive to said predetermined resistance to movement of individual ones of said cards for identifying said individual cards.

3. Apparatus for handling a plurality of cards for transferring said cards concurrently between first card locations and second card locations comprising a movable housing including said first card locations, means for positioning said housing adjacent said second card locations, a plurality of card engaging elements disposed in said housing for movement between said first card locations and said second card locations, driving means coupled to said plurality of card engaging elements, first means for energizing said driving means to drive said elements toward said second card locations, means operable for braking said driving means, means for normally operating said braking means when said card engaging elements are positioned for engaging cards at said second card locations, means for operating said card engaging elements to individually engage respective ones of said cards at said second card locations, second means for energizing said driving means in a reverse direction to transfer said engaged cards from said second card locations to said first card locations, means including said first means for energizing said driving means to transfer said engaged cards from said first card locations to said second card locations, means including said individual card engaging means for detecting predetermined resistance to movement of individual ones of said engaged cards between said first card locations and said second card location, and means responsive to said detecting means for operating said braking means.

4. Card handling apparatus in accordance with claim 3 wherein said second card locations include respective individual card positioning stops, the combination further comprising means operable during the transfer of engaged cards from said first card locations to said second card locations for preventing the operation of said means for normally operating said braking means, said means responsive to said detecting means operating said braking means when said engaged cards are positioned in said second card locations.

5. Card handling apparatus in accordance with claim 4 further comprising third means for energizing said driving means in a reverse direction, means for operating said braking means when said card engaging elements are positioned for engaging cards at said second card locations, means for operating said card engaging elements to disengage said engaged cards, and means including said third means responsive to the disengagement of said cards for returning said card engaging elements to a starting position.

6. Apparatus for handling a plurality of cards for transferring said cards between first card locations and second card locations comprising a plurality of card engaging elements each rotatably disposed in a movable carriage assembly, means operable at said first and second card locations for rotating each of said card engaging elements to a first position to engage respective ones of said cards and for rotating said card engaging elements to a second position to disengage said cards, driving means coupled to said carriage assembly, first means for energizing said driving means to drive said carriage assembly from said first card locations to said second card locations, second means for energizing said driving means to drive said carriage assembly from said second card locations to said first card locations, means operable for braking said driving means, means for operating said braking means when said carriage assembly is in predetermined positions at said first and second card locations, and means operative when said first energizing means is operated and responsive to a predetermined resistance to movement of said carriage assembly for operating said braking means.

7. Card handling apparatus in accordance with claim 6 wherein said last-mentioned means comprises means for individually biasing each of said card engaging elements in a predetermined position relative to said carriage assembly.

8. Card handling apparatus in accordance with claim 6 further comprising detent means for releasably retaining each of said cards in said first card locations when said card engaging elements are rotated to said second position.

9. Apparatus for handling a plurality of cards, each card having an engagement aperture therein, for transferring said cards concurrently between first card locations and second card locations randomly oriented with said first card locations, comprising a plurality of card engaging elements operable to pivotally engage respective ones of said plurality of cards, each of said card engaging elements having an engagement pin radially disposed thereon, driving means for moving said card engaging elements between said first and said second card locations, and means for operating said card engaging elements at said first and said second card locations, said operating means including means for rotating each of said card engaging elements such that said pin thereon engages said aperture of a respective one of said cards.

10. Card handling apparatus in accordance with claim 9 wherein said rotating means comprises a rotatable shaft extending between first and second card locations, means for rotating said shaft, means coupling said shaft to each of said card engaging elements such that rotation of said shaft effects corresponding rotation of said elements, and means for slidably mounting said coupling means on said shaft for movement between said first and second card locations.

References Cited

UNITED STATES PATENTS 1,709,430 4/1929 Hentzschel ---------- 129—16.1

MAYNARD R. WILBUR, *Primary Examiner.*

DARYL W. COOK, A. L. NEWMAN, J. H. WALLACE, Jr., *Assistant Examiners.*